United States Patent
Bailey, II

(10) Patent No.: US 8,112,125 B2
(45) Date of Patent: Feb. 7, 2012

(54) VOICE ACTIVATED DIALING FOR WIRELESS HEADSETS

(75) Inventor: William P. Bailey, II, Lithonia, GA (US)

(73) Assignee: AT&T Intellectual Property I, LP, Atlanta, GA (US)

(*) Notice: Subject to any disclaimer, the term of this patent is extended or adjusted under 35 U.S.C. 154(b) by 746 days.

(21) Appl. No.: 11/558,547

(22) Filed: Nov. 10, 2006

(65) Prior Publication Data

US 2008/0113689 A1    May 15, 2008

(51) Int. Cl.
*H04W 40/00* (2009.01)
*H04M 1/00* (2006.01)

(52) U.S. Cl. .................. 455/569.1; 455/445; 455/556.1; 455/575.1

(58) Field of Classification Search ................ 455/569.1, 455/550.1, 575.1, 575.6, 426.1, 556.1, 420, 455/41.1, 552.1, 553.1; 351/158
See application file for complete search history.

(56) References Cited

U.S. PATENT DOCUMENTS

| 7,072,686 | B1* | 7/2006 | Schrager .................... 455/556.1 |
| 7,085,358 | B2 | 8/2006 | Ruckart |
| 7,254,368 | B1* | 8/2007 | Okada et al. ................. 455/41.3 |
| 7,881,741 | B2* | 2/2011 | Horiuchi et al. .............. 455/522 |
| 2002/0068600 | A1* | 6/2002 | Chihara et al. ............... 455/550 |
| 2005/0037818 | A1* | 2/2005 | Seshadri et al. ........... 455/569.1 |
| 2006/0193280 | A1* | 8/2006 | Lee et al. ...................... 370/315 |
| 2006/0205408 | A1* | 9/2006 | Nakagawa et al. ........... 455/445 |

* cited by examiner

*Primary Examiner* — George Eng
*Assistant Examiner* — Nizar Sivji
(74) *Attorney, Agent, or Firm* — Moazzam & Associates, LLC

(57) ABSTRACT

Provided are methods and systems for hands free communication with a wearable telecommunication device configured to recognize a command associated with the audio message and executing the command by communicating wirelessly with at least one communication device or a mobile telecommunication system. The wearable wireless telecommunications headset includes a casing containing a speaker for receiving an audio message, a microphone for sending an audio message, transceiver and a processor programmed for voice recognition. Methods are provided for direct communication with a telecommunication system and also communicating with a telecommunications system via an intermediary local device.

16 Claims, 7 Drawing Sheets

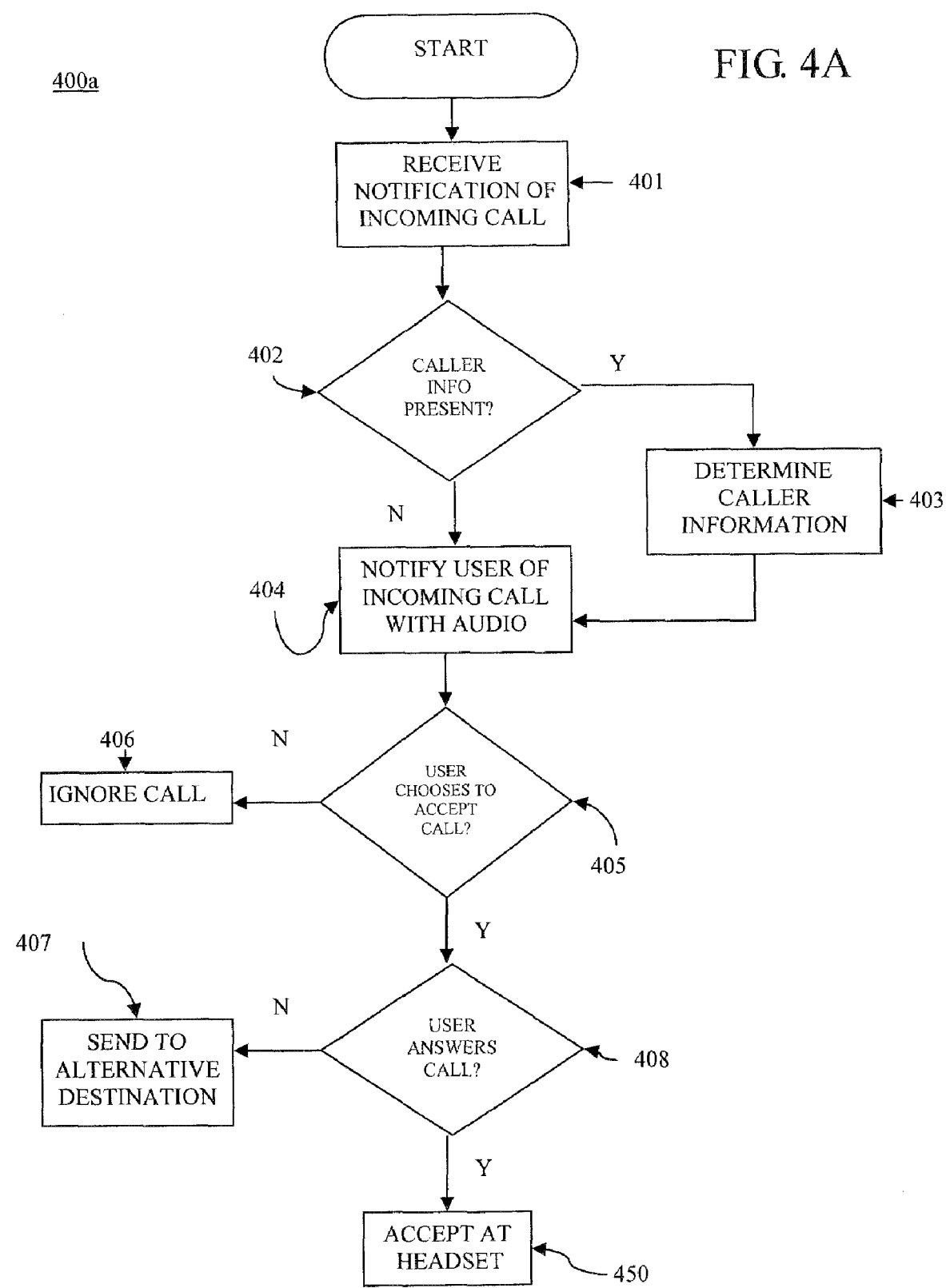

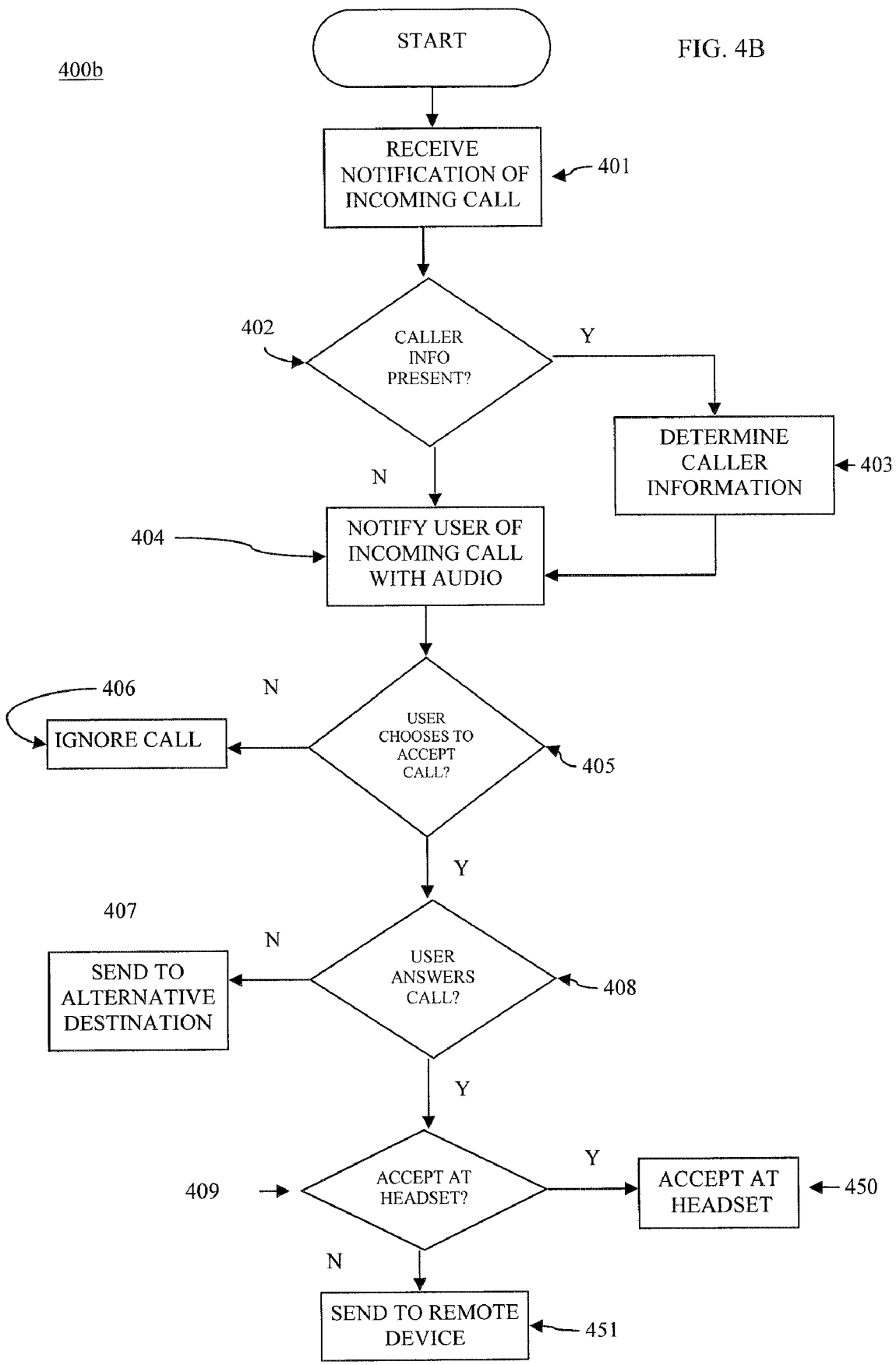

VOICE ACTIVATED DIALING FOR WIRELESS HEADSETS

BACKGROUND

Wireless headsets are popular devices for cell phone users. The portability and convenience of wireless headsets have convinced professional and amateur users alike to switch from wired headsets, conventional cell phone speakers and microphones. Wireless headsets generally may include one or more components for transmitting sound (e.g., a speaker) one or more components for receiving sound (e.g. a microphone), and one or more signaling components (e.g. a radio), the combination of these components enable a user to wirelessly listen to an audio message and/or participate in a conversation.

Conventionally, wireless headsets are used in conjunction with detached cell phones. A user may, for example, have a cell phone in his pocket, the cell phone being simultaneously in communication with both a cell tower and a wireless headset affixed to the user's ear or head. Even though cellular telephones have been reduced in size and are sleeker in design, they still constitute a weight that must be carried in a pocket, purse or on a belt.

If a user, however, wishes to enjoy the benefits of a cellular telephone without the inconvenience of carrying an extra weight in his pocket or on his belt, the existing solutions fall short. Furthermore, if a user wants to receive audio announcement information about an incoming call through his headset, again existing solutions fall short. Finally, if a user wants the ability to connect to a remote person or location using audio commands, headset solutions do not handle such commands in as simple and centralized a method as possible.

SUMMARY

It should be appreciated that this Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Exemplary embodiments include a wireless telecommunications headset casing being detachably secured to a user's head and containing a speaker for providing audio to a user, a microphone for receiving an audio message from a user, a transceiver for communicating with a mobile telecommunication system and a processor for recognizing a command associated with the audio message and executing the command.

Exemplary embodiments provide a method to establish a communication by a headset. The method includes receiving an audio signal from a user at the headset via a microphone attached to the headset. An audio command is then derived from the audio signal, allowing the headset to establish a communication with the recipient over a mobile communication system based in part on the audio command.

In accordance with other exemplary embodiments, a computer readable medium is provided with instructions to receive an audio signal from a user via a microphone attached to the headset. An audio command is then derived from the audio signal, allowing the headset to establish a communication with the recipient over a mobile communication system based in part on the audio command.

Other apparatuses, methods, and/or computer program products according to embodiments will be or will become apparent to one with skill in the art upon review of the following drawings and Detailed Description. It is intended that all such additional systems, methods, and/or computer program products be included within this description, be within the scope of the present invention, and be protected by the accompanying claims.

BRIEF DESCRIPTION OF THE DRAWINGS

FIG. 4A is a flow chart illustrating an exemplary method for receiving an incoming phone call using a wireless telecommunications headset; and FIG. 4B is a flow chart illustrating an exemplary method for receiving an incoming phone call using a wireless telecommunications headset utilizing remote devices.

DETAILED DESCRIPTION

Figure 1A:
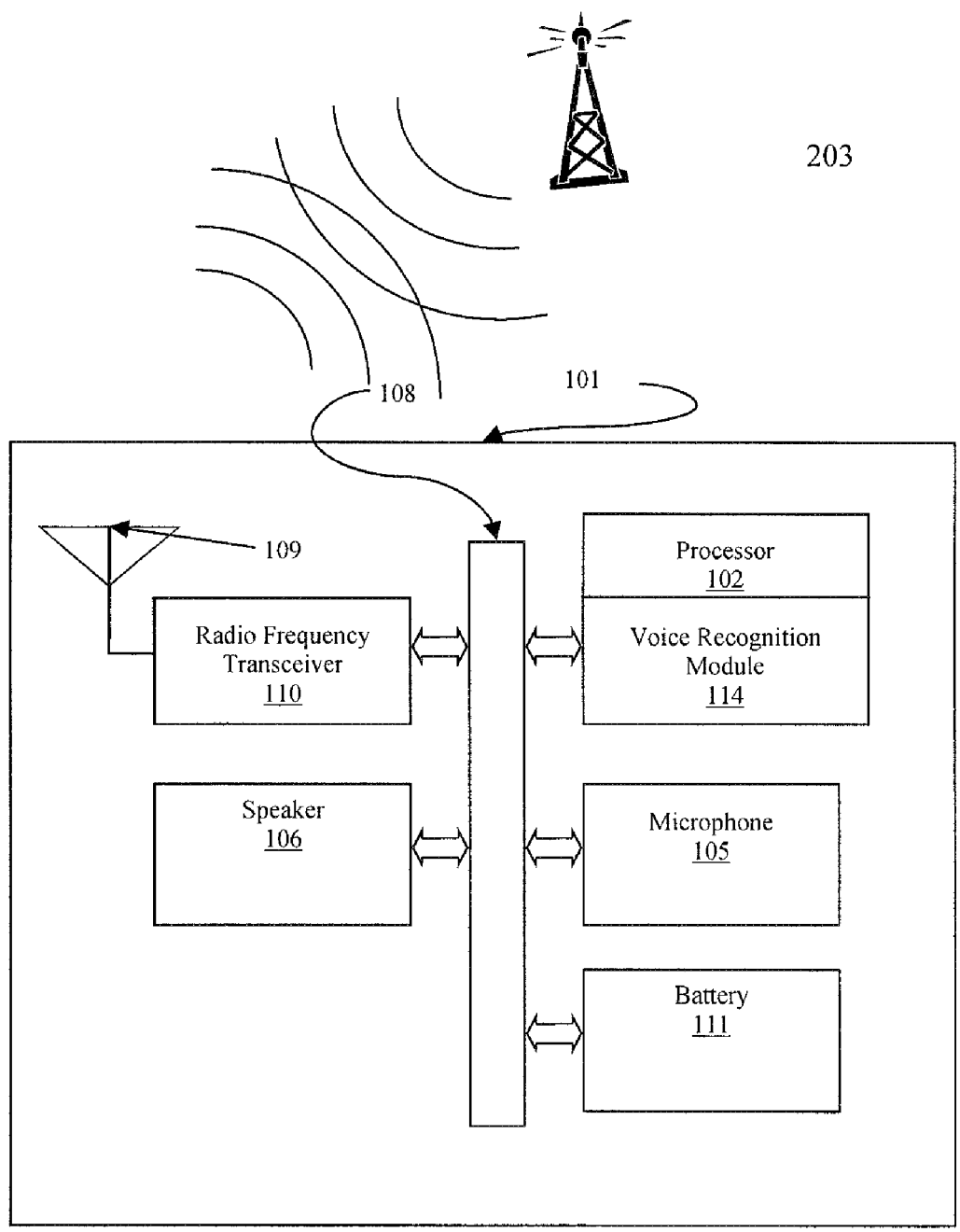
FIG. 1A is a block diagram illustrating functional components that may be found in a wireless telecommunications headset.

The following detailed description is directed to an apparatus and method for receiving and initiating telephone calls. In the following detailed description, references are made to the accompanying drawings that form a part hereof and which are shown, by way of illustration, using specific embodiments or examples. Referring now to the drawings, in which like numerals represent like elements through the several figures, aspects of the apparatus and methods provided herein will be described.

FIG. 1A is a block diagram illustrating functional components that may be found in a wireless telecommunications headset 101. Headset 101 may be wearable by a user. For example, headset 101 may be formed so as to affix to the head of a user by wrapping around an ear or inserting at least partially within the ear canal, or the headset may include a speaker for one or both ears and extend over or around the head as with conventional headphones. Headset 101 may also be separated into multiple physical components attached to each other using wired and/or wireless schemes (e.g. separate microphone or battery attached by a wire). Although represented here by distinct blocks for clarity, functional components of headset 101 may be combined into a single component (e.g. processor with on-board memory) and/or split into multiple components (e.g. multiple co-processors).

As illustrated in FIG. 1A, the headset 101 may include a processor 102. Processor 102 may include a central processing unit, an embedded processor, a specialized processor (e.g. digital signal processor), or any other electronic element responsible for interpretation and execution of instructions, performance of calculations and/or execution of voice recognition protocols. Processor 102 may communicate with, control and/or work in concert with other functional components, including a microphone 105, a speaker 106, an antenna 109, a battery 111 and a voice recognition module 114. Communication between components may be facilitated by a bus 108.

Bus 108 may be inclusive of multiple buses and/or communication paths. Communication may be in the form of multiple parallel paths, a single serial path, or any other communication scheme.

Processor 102 may include a voice recognition module ("VRM") 114. VRM 114 may be any available voice recognition hardware, software or firmware allowing audio commands uttered by the user 201 to be transformed into electronic commands understandable by processor 102 or the other components of headset 101. As an alternative, VRM 114 may reside on a remote device 202 or 205 capable of communicating with headset 101.

RF transceiver 110 is capable of communicating wirelessly with a transponder of a telecommunications system 203 using antenna 109 or a second antenna, if desired. RF transceiver 110 may include multiple radios, each being specialized for different frequencies and/or reception and transmission. The telecommunications system 203 may be any telecommunications system including a mobile telecommunications system where the user may travel from base station-to-base station or hot spot-to-hot spot. A telecommunications system may be an analog or digital cellular telecommunications system. Moreover, the telecommunications system 203 may be a Personal Communication Service (PCS) in either of its analog and digital versions. The telecommunication system 203 may utilize Time Division Multiple Access (TDMA), Code Division Multiple Access (CDMA), Frequency Division Multiple Access (FDMA) or Global System for Mobile (GSM) technologies. The telecommunication system 203 may be a satellite communication system.

Microphone 105 and speaker 106 may each include any form of transducer capable of converting audio waves into electrical signals (as with the microphone) and/or converting electrical signals into audio waves (as with the speaker). Ultimately, these components enable a user of headset 101 to participate in a telephonic conversation and may also enable the user to provide audio commands and receive audio. Microphone 105 and speaker 106 may be designed to also provide "speaker phone" capability for conference call use.

According to exemplary embodiments, each electronic component comprising headset 101 is powered by battery 111. Battery 111 can be any type of battery commensurate with the manufacturer's ultimate design choices. As non-limiting examples, such a battery can be a rechargeable or disposable battery and can range from a ubiquitous AAA battery to a miniature lithium ion battery. If the headset 101 is disposable, the battery does not have to be replaceable. The composition of the battery is not essential to the subject matter being described herein as long as the power provided is sufficient to the manufacturer's ultimate design. Battery 111 can be integrated into the headset 101 or reside externally and provide power via an external cable.

Figure 1B:
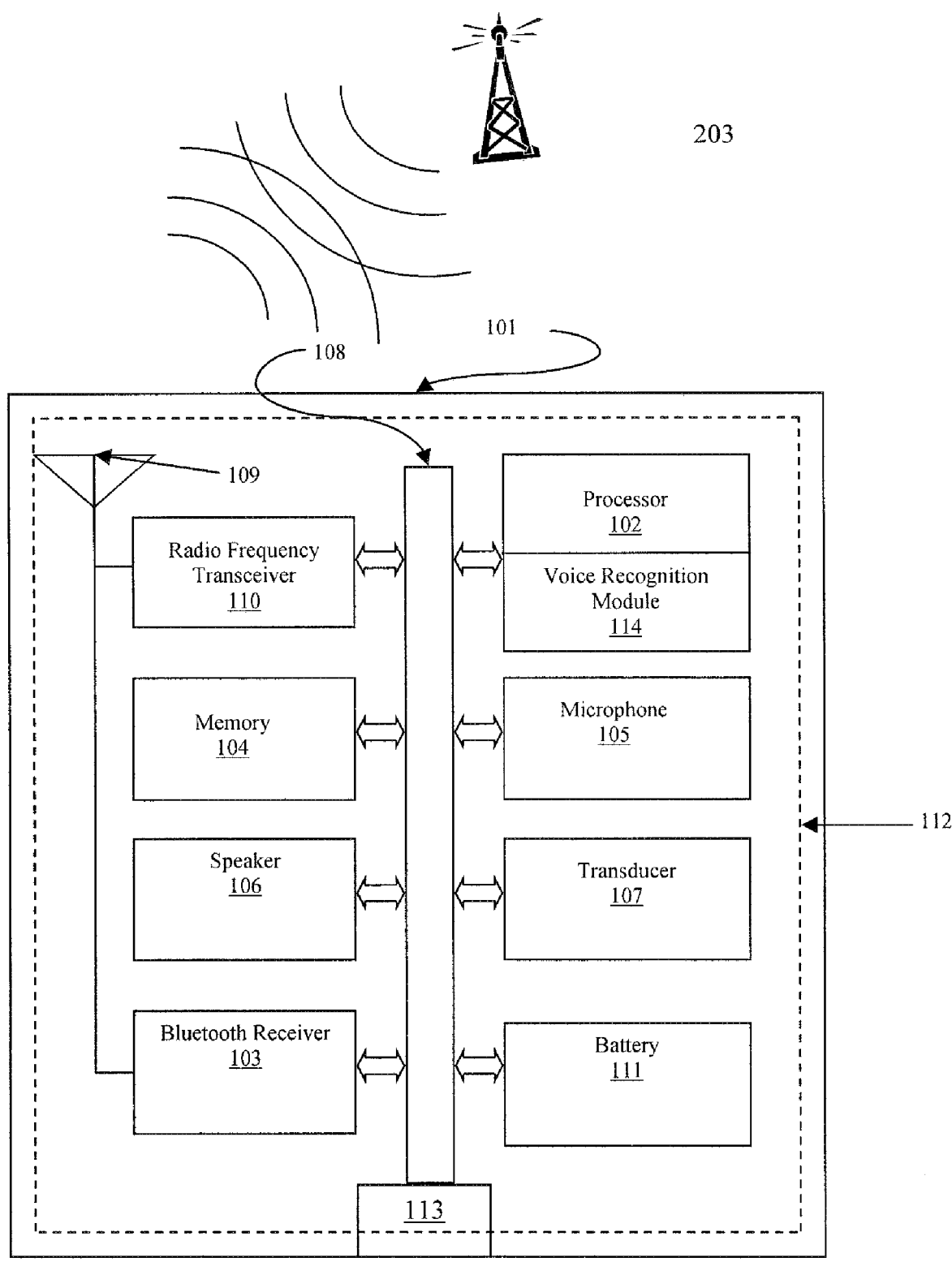
FIG. 1B is a block diagram illustrating an optional embodiment including additional functional components that may be found in a wireless telecommunications headset.

FIG. 1B is a block diagram illustrating an optional embodiment including additional functional components that may be found in a wireless telecommunications headset 101. Headset 101, wearable by a user, may also include a local transceiver 103, a memory 104, a transducer 107, shielding 112 and a synchronizing connection 113.

Local transceiver 103 is capable of communicating wirelessly with other local devices using electromagnetic frequencies broadcasted and received using antenna 109. Transceiver 103 may include multiple radios. Local transceiver 103 may include transmitters and/or receivers capable of utilizing radio standards for communicating with remote devices. As an example, local transceiver 103 may be of limited range and be enabled to utilize a Bluetooth® radio standard. Radio standards may also include Ultra-Wideband (UWB), Wireless USB (WUSB), Wi-Fi (IEEE 802.11), WiMAX. WiBro, infrared, near-field magnetics, HiperLAN, and so forth. These short range radio standards will be referred to as the local network or local system. The local transceiver may also be an optical transceiver operating in commonly used spectra such as the infrared or ultraviolet spectra. Antenna 109 of the headset 101 may include multiple antennas, each being specialized for different frequencies and/or reception and transmission.

The headset 101 may include shielding 112 as protection for the user in order to directionally attenuate any RF energy being emitted from transceivers 103 and/or 110. Shielding 112 may be constituted from any materials known to one of ordinary skill in the art as being suitable for such purposes now or in the future.

Memory 104 may be utilized for the storage of electronic data and electronic instructions for use by processor 102. Memory 104 may include one or more types of computing memory, including volatile (powered) and non-volatile forms of memory. Volatile memory are most commonly comprised of integrated circuits and may include various forms of static random access memory (SRAM) and dynamic random access memory (DRAM). Non-volatile memory may include integrated circuit forms of memory such as flash memory, as well as other categories of memory including magnetic and/or optical forms of data storage. As above, memory 104 may be comprised of a single integrated circuit, or multiple components. Memory 104 may record multiple types of data also including ring tones, caller ID information, operational instructions and all types of databases. In the alternative, the memory 104 may be resident on a remote computing device 205 such as a nearby personal computer, which is accessible by the local transceiver 103. Memory 107 may also contain VRM 114 or instructions associated with VRM 114.

Transducer 107 may provide an additional input method for providing or prompting commands by the user. Transducer 107 may be a button, toggle, touchpad or other suitable device to convert mechanical energy into an electrical signal. Transducer 107 may include a touch sensor, a motion sensor, a sound sensor, or any other component capable of providing or prompting commands by the user. For purposes of headset 101, the functionality of transducer 107 may be integrated with microphone 105 so as to enable vocal commands or prompts by the user. Transducer 107 can be comprised of a single multifunction transducer, multiple single purpose transducers that operate in conjunction or independently with each other and/or multiple multifunction transducers that operate in conjunction or independently with each other. If desired, multifunction transducer 107 can also be a single function transducer. Transducer 107 may be used to initiate any number of functions associated with headset 101. Transducer 107 may be used to initiate a call, receive a call, send a call to voice mail, terminate a call, initiate/terminate speaker phone capability for microphone 105 and speaker 106 or select a phone number to call. The preceding list of functions controlled by transducer 107 is exemplary and may be expanded to include any and all functions of headset 101.

Headset 101 may include synchronizing connection 113 ("sync connector"). Sync connector 113 may be used to receive and deliver updates and downloads via a computing device such as remote device 205, for example. Sync connector 113 may communicate by a radio protocol (i.e. Bluetooth®), optics (i.e. infrared) by a cable connection or any other available communication medium. Updates and downloads may be also accomplished from telecommunications system 203.

Figure 2:
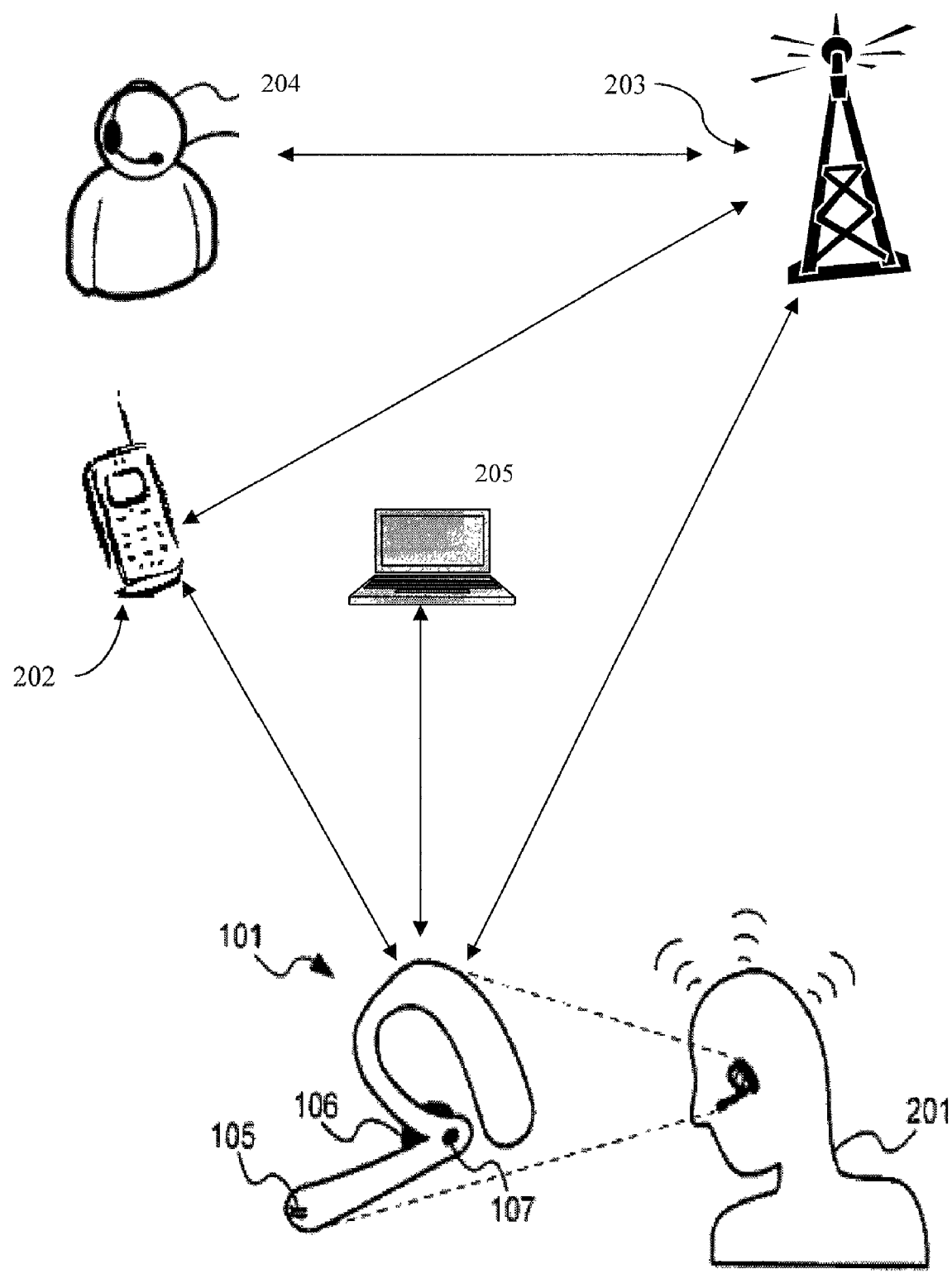
FIG. 2 depicts an exemplary wireless telecommunications headset in communication with multiple remote devices and a telecommunications system.

FIG. 2 depicts an example of wireless telecommunications headset 101 in use with telecommunication system 203. User 201 may wear headset 101 over one ear. User 201 may speak such that microphone 105 can pick up the user's voice. A user 201 may hear synthesized audio feedback from headset 101, via VRM 114, as well as the voices of others via speaker 106. User 201 may also prompt, or otherwise command headset 101, using transducer 107 or by speaking audio commands into microphone 105 which are then converted to digital signals by VRM 114 and processor 102. Via VRM 114, audio commands may be used to control any and all functions of headset 101. For example, such audio commands may direct processor 102 to connect RF transceiver 110 with telecommunication system 203 and dial a particular number. Such communication can use any radio standard used by the telecom provider.

Headset 101 may optionally be in wireless communication with one or more local remote devices 202 and 205, simultaneously via a local network. Remote devices may include conventional telephonic devices in addition to other less conventional devices, including personal computers and video enabled phones. Wireless communication may be in the form of a Bluetooth® radio standard, or other wireless standards as discussed above. For example, when user 201 is at home, headset 101 may be connected to a home phone, such as the communication device 202 via a Bluetooth® wireless connection. User 201 may have already authorized headset 101 to communicate with the communication device 202 using an authentication process such as pairing. The communications device 202 may have wireless networking built in to communicate with headset 101 or the home phone may be connected through a wireless converter which converts wireless signals back and forth into conventional wired telephone signals. The communications devices 202 and 205 may include POTS phones, Voice over Internet Protocol (VoIP), WiFi phones, computers and Personal Digital Assistants (PDAs).

In an exemplary embodiment, headset 101 acts as a conduit for audio signals, acting as a receiver and transmitter of a conversation between user 201 and remote user 204. When user 201 speaks, audio waves are converted to analog electronic signals by microphone 105. The analog signals may or may not be processed by processor 102 to convert them into digital signals, for example, by digital sampling of the analog signal. Either way, according to exemplary embodiments, signals are transmitted wirelessly by RF transceiver 110 directly to the telecommunications system 203 for communication with remote user 204. Telecommunications system 203 may include, a packet switched data network such as the Internet, or any combination of networks used to distribute information such as voice and/or data signals. Likewise signals may return along the same or a different path through the same wireless connection for conversion to audio waves for user 201 to hear.

In other exemplary embodiments, headset 101 may interpret audio commands delivered verbally by user 201. The user 201 may prompt headset 101 to make a call by either speaking a particular word or phrase, by manipulating transducer 107 or both. Headset 101 may then use speech recognition techniques, via VRM 114, to interpret a verbal command provided by user 201. The command may include a telephone number to be dialed or a name from an address book to be dialed from memory device 104. Once the command is interpreted by processor 102, headset 101 may act on the command by, for example, transmitting signals to telecommunications system 203 via RF transceiver 110.

Once wireless headset 101 determines a phone number associated with the audio command, the phone number may be converted to an audio message to be delivered as feedback to user 201 prior to dialing, or it may be automatically dialed without providing feedback. An address book created by user 201 and stored in memory 104 may include a listing of names, other identification information and one or more telephone numbers associated with each of the names and/or other identification information.

If, in addition to headset 101, user 201 also owns communication device 202, then the user may wish to utilize wireless headset 101 in conjunction with the communication device 202. Communication device 202 may be in communication with remote user 204 over telecommunication network 203. User 201 may pair headset 101 with communication device 202. In this fashion, headset 101 may be used either with the communication device 202 or with the telecommunication network 203. When making an outgoing call using headset 101, user 201 may have to indicate a choice to connect with either communication device 202 or with network 203 if both are in range of the headset. This indication may occur at the time of the call. Choice of connection may be signaled by depression of button 107 or by an audio command via VRM 114. Alternatively, an indication of priority may have been previously provided thus making one remote device preferred over another when both are in range. A list of remote devices in a preferred access order may be stored in memory 104 of headset 101. Another alternative may involve headset 101 weighing the relative strength of the wireless signal between both devices and using the device with the strongest signal to make the outgoing call.

When receiving an incoming call on either communication device 202 or telecommunication network 203, headset 101 may announce the incoming communication, either through a generated voice, a particular sound, or the use of other feedback mechanisms such as text on an LCD display or LED lights. Such an announcement may include incoming caller information. For example, an audio announcement of an incoming call may be generated stating, "Headset is receiving a call from (202) 555-1212". If user 201 is engaged with a call via a communication device (e.g., home phone 202), and an incoming call is received on headset 101 (e.g. from cellular network 203), then one of a number of actions may be taken. For example, headset 101 may notify the user about the call on the headset 101 using a VRM 114 generated voice such as, "receiving a call from (404) 555-4132". Headset 101 may alternatively provide a simple audio prompt (such as a "beep"), to announce a new incoming call similar to a call waiting tone. Headset 101 may also ignore the incoming call, if so configured. If, user 201 is alerted to an incoming call, headset 101 may enable the user to place the current call on hold while handling the incoming call from the other device by enunciating a verbal command or manipulating transducer 107.

Incoming call announcements may be utilized regardless of whether a current call is ongoing. Such announcements may be determined by announcing a name or other identification information associated with a call rather than the phone number. For example, the announcement of an incoming call may be, "headset is receiving a call from Joe Smith" or "headset is receiving a call from Dad". The identification information may be pulled from standard Caller ID information associated with the incoming call by processor 102. Identification information may also be determined by performing a reverse lookup of the incoming telephone number in an address book that could be stored in memory 104. For example, if user 201 has an address book stored in memory 104 of headset 101, the headset may analyze the incoming caller information and perform a lookup based on the incoming telephone number. Once an associated name or other identification information is determined, the identification information can be made part of the vocal announcement played out of speaker 106 on headset 101. A user may then decide whether or not to answer the incoming call using an audio command spoken into microphone 105, or by depressing button 107, or by other known input methods.

Headset 101 may also be linkable with additional remote devices such as remote device 205. Remote device 205 may have a wireless radio standard built in (e.g., Bluetooth® functionality included with the device). Headset 101 may utilize incoming call announcements for incoming calls associated with remote device 205. Headset 101 may also utilize one of the priority schemes identified above when making outgoing calls in the presence of, for example, office phone 202 and device 205. In a situation where both remote devices receive incoming calls at the same time, headset 101 may permit user 201 to choose which call to answer using transducer 107 or an audio command. Alternatively, the headset may utilize a priority scheme similar to the schemes described above, including having previously identified one device (e.g., communication device 202) as having priority over another (e.g. device 205) for incoming calls. Alternatively, headset 101 may simply compare the relative wireless signal strengths of the connections to both devices and choose the strongest signal when deciding which incoming call to connect. Remote device 205 may also act as a local server to store information and execute commands for headset 101.

Figure 3A:
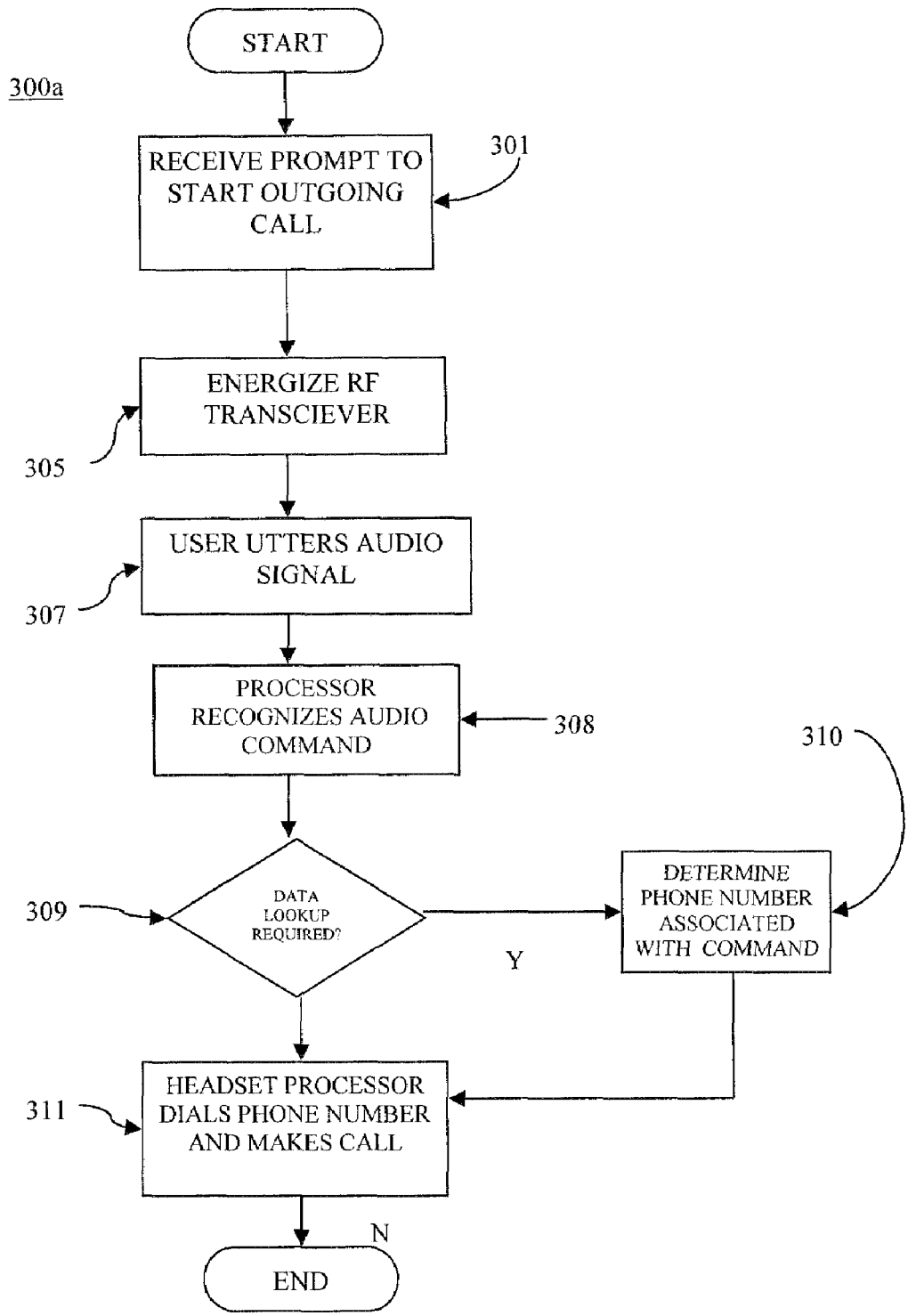
FIG. 3A is a flow chart illustrating an exemplary method for initiating an outgoing phone call from a wireless telecommunications headset.

FIG. 3A is a flow chart illustrating an example routine 300*a* for initiating an outgoing communication (e.g. a phone call) from wireless telecommunications headset 101. The functional blocks displayed in this and other flowcharts are intended to suggest an order for completing a method. The blocks and their order, however, are not intended to provide the exact method for performing the method. Instead, functional blocks may be combined, split reordered, added and removed.

In the example shown in FIG. 3A, a prompt is received by wireless telecommunications headset 101 from user 201 to initiate an outgoing call at operation 301. The prompt may be in the form of a transducer 107 manipulation, an audio command (via VRM 114), or similar input. Upon receipt of the prompt, the RF transceiver 110 is energized by the battery 111 at process 305 or alternatively, the power level to the RF receiver 110 is increased.

At operation 307, user 201 utters an audio message which is received via microphone 105 and may be stored digitally in memory 104. The contents of the audio message may initially be unknown to headset 101 but at operation 308 processor 102 performs speech recognition analysis using VRM 114 on the stored audio message, thus achieving a level of recognition of what user 201 uttered. A command may be recognized, such as "work phone" and/or "Dial 2 0 2 5 5 5 1 2 1 2," or "Dial Joe Smith Mobile." Such speech recognition techniques are widely known, and may require that user 201 have previously trained headset 101 as to the peculiarities of the user's voice.

At decision point 309, a determination is made as to whether the recognized command requires a phone number lookup, as with "Dial Joe Smith Mobile". If so, a phone number associated with the name in the command is determined at process 310. This determination may be achieved by processor 102 looking up the name in an address book stored in memory 104 within headset 101. This lookup may look for an exact match, or it may use phonetic approximation to find the name which sounds closest to the recognized command.

At operation 311, the resulting phone number is dialed by processor 102 in order that the call be initiated via telecommunications system 203, at which point user 201 can converse wirelessly with remote user 204. Routine 300*a* ends after user 201 begins his conversation via RF transceiver 110.

Figure 3B:
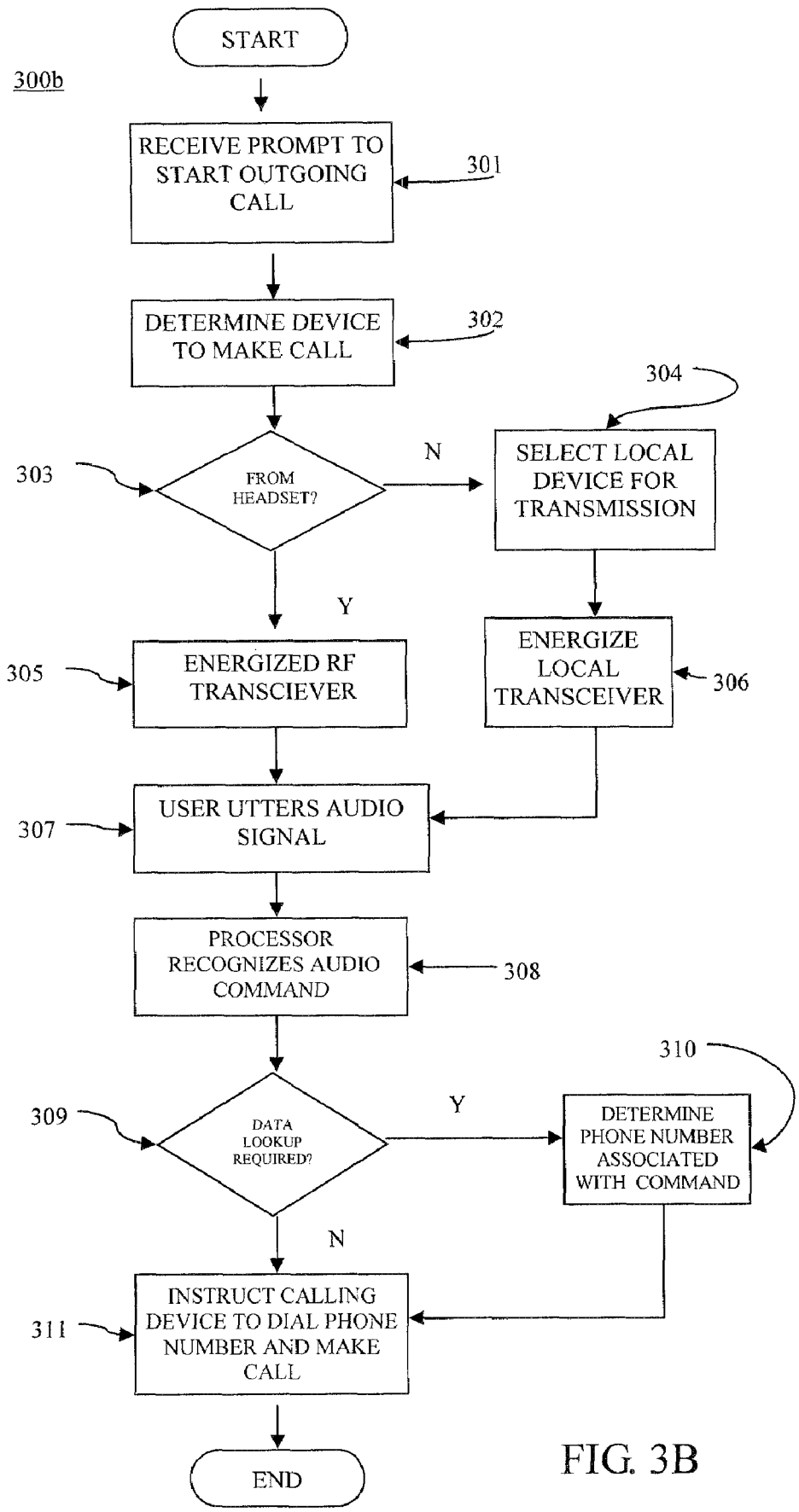
FIG. 3B is a flow chart illustrating an exemplary method for initiating an outgoing phone call from a wireless telecommunications headset utilizing remote devices.

FIG. 3B is a flow chart illustrating an example routine 300*b* for initiating an outgoing communication from wireless telecommunications headset 101 with optional remote devices 202 and/or 205 included. In the example shown in FIG. 3B, at operation 301, a prompt is received by wireless telecommunications headset 101 from user 201 to initiate an outgoing call. The prompt may be in the form of a transducer manipulation, an audio command via VRM 114, or similar input. At operation 302, if multiple remote devices (e.g. 202 and 205) are within range and appropriately authorized, headset 101 determines which of the devices to use to initiate the call. At decision point 303, a determination is made as to whether the call will be made directly from the RF transceiver 110 of the headset 101 to telecommunication system 203 or whether a local communication device, such as the devices 202 and 205, will be used and selected in step 304 in which case the local transceiver 103 will be activated in step 306. This determination may be made by user 201 manipulating transducer 107, by user 201 uttering an audio command to processor 102 via microphone 105 or by a preconfigured set of rules.

An example of a rule may be to access a home phone first via local transceiver 103, a work phone second via local transceiver 103, and then to the headset third via RF transceiver 110 during daytime hours, but always use the headset after 7 pm. Other rules are certainly configurable. Headset 101 may use the remote device 202 having the strongest signal via local transceiver 103. Another alternative is to have the headset 101 select a remote device based on the phone number being dialed. For instance, certain numbers may need to go out over the work phone (e.g., international calls), in which case local transceiver 103 would be used in conjunction with the work phone while other calls go out over the headset RF transceiver 110 (i.e. personal calls). Another alternative is to have user 201 select among the available remote devices. This selection may be made by audibly prompting user 201 to select a remote device 202 and awaiting a selection in the form of a vocal or other input or by manipulating transducer 107.

At operation 307, user 201 utters an audio message which is received via microphone 105 which may be stored digitally in memory 104, via VRM 114. The contents of the audio message may initially be unknown to headset 101 but at operation 308, processor 102 performs speech recognition analysis on the audio message, achieving a level of recognition of what user 201 uttered. A command may be recognized by VRM 114, such as "work phone" and/or "Dial 2 0 2 5 5 5 1 2 1 2," or "Dial Joe Smith Mobile." Such speech recognition techniques that may be used by VRM 114 are widely known, and may require that user 201 have previously trained headset 101 as to the peculiarities of the user's voice.

At decision point 309, should the recognized command require a phone number lookup, as with "Dial Joe Smith Mobile", a phone number associated with the name in the command is determined at operation 310. This determination may be achieved by looking up the name in an address book stored in memory 104 within headset 101. This lookup may look for an exact match, or it may use phonetic approximation to find the name which sounds closest to the recognized command. The number determination may also be performed with the assistance of a remote device, with headset 101 communicating with the remote device 202 or other devices. This communication may supply a text to a remote device which performs a lookup and returns the appropriate phone number or numbers. Communication with the helping remote device may also include other devices which can be used as backup lookups should an initial lookup fail. A remote device may also assist with the speech recognition process, sharing the work involved in recognizing a command.

At operation 311, the resulting phone number is sent to one of the remote devices (e.g. device 202) or to headset 101 in order that it be dialed and the call initiated, at which point user 201 can converse wirelessly with remote user 204. Once the remote device has been instructed to dial the phone number, routine 300b ends.

FIG. 4A is a flow chart illustrating an example routine 400a for receiving an incoming communication (e.g. a phone call using wireless telecommunications headset 101). At operation 401, headset 101 receives notification of an incoming telephone call. The notification may include a generated voice announcing the incoming call or maybe an audio prompt such as a beep or tone. At operation 402, a decision is made as to the presence of caller ID information by processor 102. At operation 403, the caller ID information is detected as a part of the notification. If caller information is present, it may be used to notify the user 201 at operation 404. This may involve identifying a calling phone number. In addition, a calling number may be used to perform a reverse look up in an address book stored in headset 101 in order to associate a name with the number. The detection of caller identification information at process 403 may use many of the same methods described with regard to FIGS. 3A and 3B, above. At operation 403, a text-to-speech algorithm associated with VRM 114 may be used to convert incoming caller information and other information (e.g., information indicating an initiator of the communication or information indicating which device is being called) into an audio message for presentation to user 201 via speaker 106. For example, "Joe Smith is calling your cell phone," or "Your home phone is ringing with phone number 202-555-1212."

At operation 405, headset 101 waits to see if user 201 wants to accept the incoming call. User 201 may signal his assent by speaking an audio command (e.g., "Pick Up"), or otherwise inputting his assent such as physically manipulating transducer 107. If user 201 chooses to ignore the call, user 201 may decline to take the call by waiting a set period of time, manipulating transducer 107 or speaking an audio command (e.g. "cancel") at operation 406. If the user declines to answer the call at operation 405, the call may be ignored or headset 101 may inform the source remote device to ignore the call. If user 201 chooses to accept the call he can further choose to send the call to voice mail at which point the call is connected at operation 407 by manipulating transducer 107 or speaking another audio command (e.g. "Voice Mail"). If the call is answered, then processor 102 connects the call to microphone 105 and speaker 106 and conversation can occur normally. Once a call is either connected to allow the user 201 to converse or is ignored, routine 400a ends.

FIG. 4B is a flow chart illustrating an example routine 400b for receiving an incoming communication with a wireless headset 101 optionally utilizing remote devices. In the example shown in FIG. 4B, at operation 401 headset 101 receives notification of an incoming telephone call. Notification may include a generated voice announcing the incoming call or an audio prompt such as a beep. At operation 402, the presence of caller ID information is available. At operation 403, caller ID information is detected as a part of the notification. If caller information is present, it may be used to notify the user 201 at operation 404. Visual caller ID information may also be utilized. U.S. Pat. No. 7,085,358 describes the use of visual caller ID information and is incorporated here by reference in its entirety.

The use of caller ID information may involve identifying a calling phone number. A calling phone number may be used to perform a reverse look up in an address book stored in headset 101 in order to associate a name with the number. Determination of identifying information may use many of the same methods described with regard the methods discussed above. At operation 403, a text-to-speech algorithm associated with VRM 114 may be used to convert incoming caller information and other information (e.g., information indicating an initiator of the communication or information indicating which device is being called) into an audio message for presentation to user 201 via speaker 106. For example, "Joe Smith is calling your cell phone," or "Your home phone is ringing with phone number 202-555-1212."

At operation 405, headset 101 waits to see if user 201 wants to accept the incoming call User 201 may signal his assent by speaking an audio command (e.g., "Pick Up"), or otherwise inputting his assent such as physically manipulating transducer 107. If user 201 chooses to ignore the call, user 201 may decline to take the call by waiting a set period of time or speaking an audio command (e.g. "cancel") at operation 406. If the user declines to answer the call it may be ignored, or headset 101 may inform the source remote device to ignore the call. If user 201 chooses to accept the call he can further choose to send the call to voice mail at which point the call is connected at operation 407 by manipulating transducer 107 or by speaking another audio command (e.g. "Voice Mail"). If the call is accepted, then headset 101 picks up the call and conversation can occur normally. Once a call is either connected or ignored routine 400b ends. Alternatively, the user 201 may choose to send the call to another local communication device 202 by manipulating transducer 107, speaking an audio command into headset microphone 105 (e.g. "transfer"). The user may then carry on the conversation on the local communication device 202.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A wireless communication headset comprising:
a microphone for receiving an audio message from a user;
a processor for recognizing a command based on the audio message from the user and executing the command;
a radio frequency (RF) transceiver in communication with the processor for directly communicating wirelessly with a mobile communication network based on the executed command;
a local transceiver in communication with the processor for communicating wirelessly with a mobile communication network through a communication device;
wherein the local transceiver automatically communicates with the mobile communication network through the communication device when the communication device receives a stronger signal from the mobile communication network than the RF transceiver and the RF transceiver automatically communicates with the mobile communication network directly when the RF transceiver receives a stronger signal from the mobile communications network than the communication device, the signal strength of each transceiver weighed locally in selecting one of the local transceiver and the RF transceiver for communication; and wherein the communication with the mobile communication network changes from using the RF transceiver to the communication device when the headset determines that the communication device receives a stronger signal from the mobile communication network than the RF transceiver and from the communication device to the RF transceiver when the RF transceiver receives a stronger signal from the mobile communications network than the communication device;
a speaker in communication with each transceiver, for providing audio to the user; and
a casing upon which to mount each transceiver, the speaker, the microphone, and the processor, the casing being detachably secured to the user's head allowing the user to engage in a conversation via the microphone and the speaker.

2. The wireless communication headset of claim 1, further comprising a memory device in communication with the processor, wherein the memory device is capable of recording digital information comprising at least one of ring tones, caller ID information, operating instructions, and a digital phone book.

3. The wireless communication headset of claim 2, wherein the memory device is removable.

4. The wireless communication headset of claim 1, further comprising a transducer in communication with the processor, capable of providing a command to the processor.

5. The wireless communication headset of claim 4, wherein the local transceiver is capable of communicating using a short range radio including one or a combination of Bluetooth®, Wireless USB (WUSB), Wi-Fi (IEEE 802.11), Wimax, WiBro, infrared, near-field magnetics and HiperLAN standards.

6. A method of communicating with a mobile telecommunications system via a wireless communications headset comprising:
receiving an audio signal from a user at a microphone of the wireless communications headset;
deriving an audio command from the received audio signal by a processor for recognizing a command based on the audio message coupled to the headset;
weighing a relative signal strength between a radio frequency (RF) transceiver on the headset and a communications device, the weighing occurring at the headset; and
establishing a communication by the headset with a recipient via the mobile telecommunications system based in part on the audio command, wherein the headset automatically communicates with the mobile telecommunications system using the (RF transceiver on the headset when the RF transceiver receives a stronger signal from the mobile telecommunications system than the communications device and the headset automatically communicates with the mobile telecommunications network through the communications device when the communications device receives a stronger signal from the mobile telecommunications system than the RF transceiver, the headset communicating with the communications device through a local transceiver on the headset;
changing the communication with the mobile communication network from using the RF transceiver to the communication device when the headset determines that the communication device receives a stronger signal from the mobile communication network than the RF transceiver and from using the communication device to the RF transceiver when the headset determines that the RF transceiver receives a stronger signal from the mobile communications network than the communication device.

7. The method of claim 6, further comprising:
receiving an incoming communication at the wireless communications headset by the transceiver associated with the wireless communications headset;
in response to the incoming communication, providing an audio alert to the user via a speaker associated with the wireless communications headset;
if the user chooses to answer the incoming communication, receiving a first input from the user enabling the user to participate in the incoming communication via the wireless communications headset;
if the user chooses not to answer the incoming communication, receiving a second input from the user transferring the communication to another destination, and;
if the user chooses not to accept the incoming communication, receiving a third input from the user to terminate the call.

8. The method of claim 6, wherein the audio command identifies the recipient of the communication; and the method further comprising:
retrieving, from a database resident on a memory device associated with the wireless communications headset, a phone number corresponding to the identified recipient.

9. The method of claim 7, wherein the audio alert is a tone.

10. The method of claim 7, wherein the audio alert is a ring tone stored in a memory device associated with the wireless communications headset.

11. The method of claim 10, wherein the ring tone is a spoken alert generated by the wireless communication headset.

12. The method of claim 7, wherein receiving a first input, a second input, or a third input comprises detecting a manipulation of a transducer associated with the wireless communications headset.

13. The method of claim 6, wherein establishing a communication with a recipient includes an audio command instructing the wireless communications headset to communicate with the mobile telecommunications system via a local communications device.

14. A non-transitory computer readable medium storing a plurality of operating instructions to be executed by a processor for communicating with a mobile telecommunications system via a wireless communications headset, the plurality of instructions comprising instructions to:
receive an audio signal from a user at a microphone of the wireless communications headset;
derive an audio command from the received audio signal by a processor for recognizing a command based on the audio message coupled to the headset;
weigh a relative signal strength between a radio frequency (RF) transceiver on the headset and a communications device, the weighing occurring at the headset;
establish a communication by the headset with a recipient via the mobile telecommunications system based in part on the audio command, wherein the wireless communications headset automatically communicates with the mobile telecommunications system using the RF transceiver on the headset when the RF transceiver receives a stronger signal from the mobile telecommunications system than the communication device, and the headset automatically communicates with the mobile telecommunications network through the communications device when the communications device receives a stronger signal from the mobile telecommunications system than the transceiver, the headset communicating with the communications device through a local transceiver on the headset; and change the communication with the mobile communication network from using the RF transceiver to the communication device when the headset determines that the communication device receives a stronger signal from the mobile communication network than the RF transceiver and from using the communication device to the RF transceiver when the headset determines that the RF transceiver receives a stronger signal from the mobile communications network than the communication device.

15. The computer readable medium of claim 14, further comprising instructions to:

receive an incoming communication at the wireless communications headset by the transceiver associated with the wireless communications headset;

in response to the incoming communication, providing an audio alert to the user via a speaker associated with the wireless communications headset;

if the user chooses to answer the incoming communication, receive a first input from the user enabling the user to participate in the incoming communication via the wireless communications headset;

if the user chooses not to answer the incoming communication, receive a second input from the user to transfer the communication to another destination, and;

if the user chooses not to accept the communication, receive a third input from the user to terminate the call.

16. The computer readable medium of claim 14, wherein the audio command identifies the recipient of the communication; and the computer readable medium further comprising instructions to:

retrieve from a database resident on a memory device associated with the wireless communication headset, a phone number corresponding to the identified recipient.

\* \* \* \* \*